Dec. 5, 1967   P. D. PECKHAM ET AL   3,356,172
MOTOR DRIVEN DOLLY FOR TRAILERS
Filed Oct. 21, 1965   2 Sheets-Sheet 1
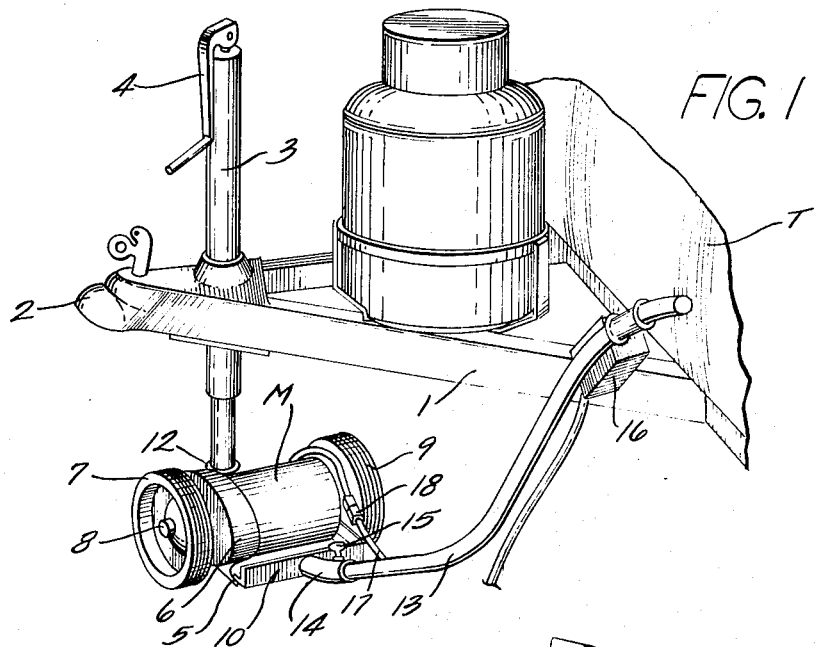
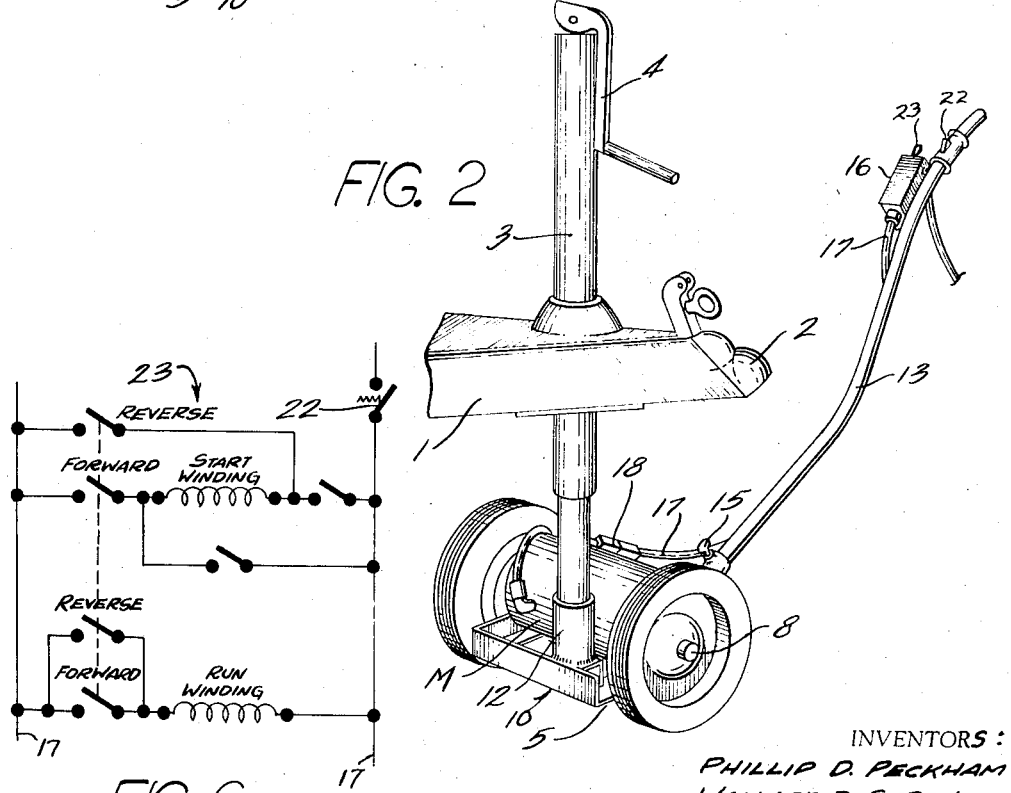
INVENTORS:
PHILLIP D. PECKHAM
WALLACE D. STROH
BY: James E. Nilles
ATTORNEY

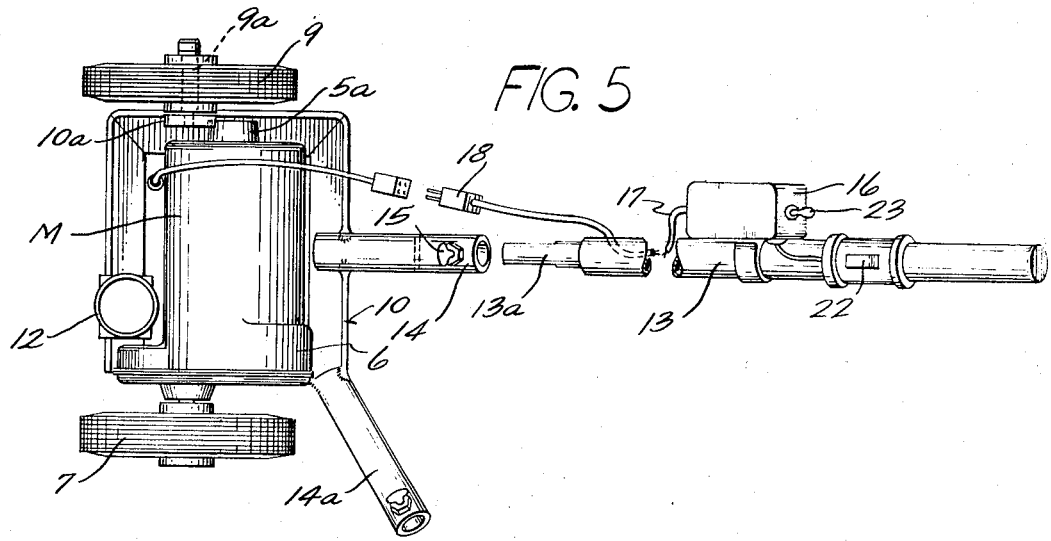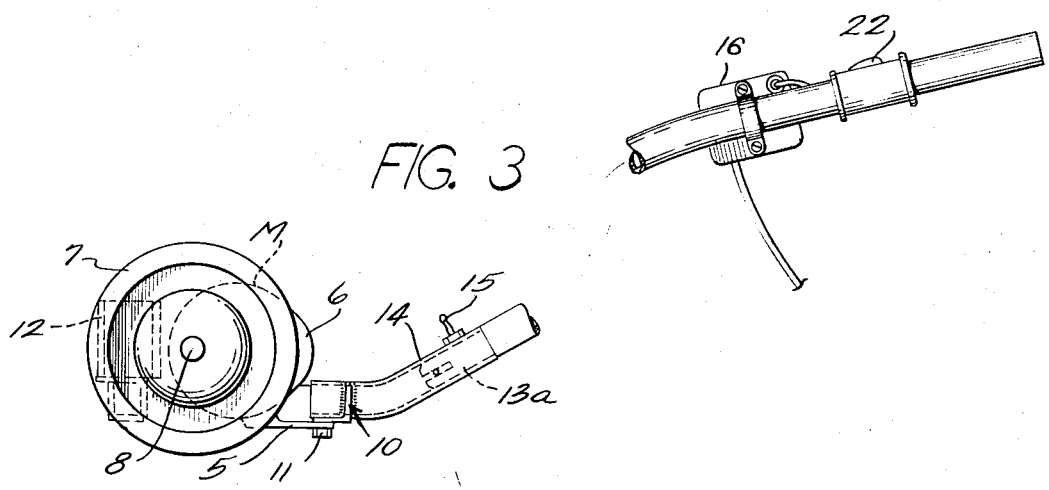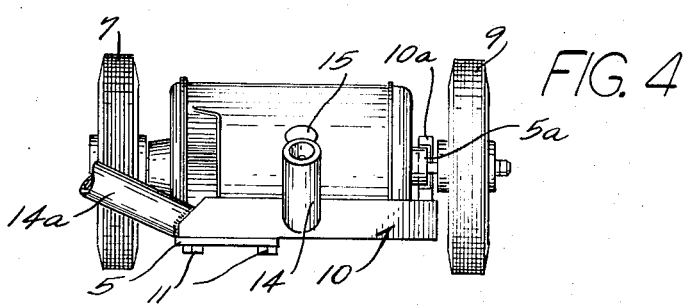

United States Patent Office 3,356,172
Patented Dec. 5, 1967

3,356,172
MOTOR DRIVEN DOLLY FOR TRAILERS
Phillip D. Peckham, 6599 Sunny Point Lane, Glendale, Wis. 53217, and Wallace D. Stroh, 17710 W. Wisconsin Ave., Brookfield, Wis. 53005
Filed Oct. 21, 1965, Ser. No. 499,844
2 Claims. (Cl. 180—19)

ABSTRACT OF THE DISCLOSURE

An electric motor driven dolly having an operator's handle and integral motor and gear reduction unit for moving trailers or the like into position. The motor is reversible and the drive wheel is connected directly to the integral motor and reduction unit to provide a very compact and easily maneuverable dolly.

The present invention relates generally to power driven dollies of the type which are used to move trailers and the like into proper position. More specifically the present invention relates to an improved electric motor driven rubber tired dolly for use in moving various trailers and the like in cramped quarters and into and out of parking position.

It is generally difficult to move trailers into cramped quarters because of the lack of space for the tractive vehicle to maneuver. As these trailers are usually rather large and heavy, it is difficult if not impossible to maneuver them by hand.

Dollies of this general type have heretofore been proposed but have not been entirely satisfactory for several reasons; for example, they themselves are usually too large to operate in the cramped quarters, they are difficult to attach to and detach from the trailer, and they are expensive to purchase and difficult to store or transport along with the trailer so as to be capable for use when they are needed.

Accordingly the present invention relates to an improved motor driven rubber tired dolly which uses an electric motor that can derive its power from an extension cord, such power usually being provided in the camping area for trailers of the type with which the present invention finds great utility. The dolly provided by the present invention is particularly compact and easily stored and transported along with the trailer itself and it can be quickly attached into operating position on the trailer or detached therefrom as when the trailer again would be reattached to the car.

More specifically the invention provides a powered dolly of the above type which has a single driven wheel attached directly to the reduction gear unit of the gear motor; a socket is provided directly on the motor frame for accommodating the frame jack of the house trailer without any special attaching parts or tools. A maneuvering handle is provided which in turn has control switches mounted thereon and by means of which the operator can both operate the motor to drive the unit in either direction and at the same time steer the unit and consequently the trailer so as to be able to conveniently maneuver the trailer.

Generally, the motor driven rubber tired dolly provided by the present invention is economical to manufacture, particularly efficient for performing the functions for which it was designed, is compact for being readily stored, and is nicely balanced when in use so as to support the entire front end weight of the trailer without sacrificing maneuverability of the unit by the operator.

These and other objects and advantages of the present invention will appear hereinafter as this disclosure progresses, reference being had to the accompanying drawings in which:

FIGURE 1 is a perspective view of a portion of the house trailer to which the present invention has been attached;

FIGURE 2 is a view similar to FIGURE 1, but taken from a different position;

FIGURE 3 is a side elevational view of the dolly shown in FIGURES 1 and 2;

FIGURE 4 is a rear elevational view of the dolly shown in the other figures, certain parts removed for clarity;

FIGURE 5 is a plan view of the dolly, and

FIGURE 6 is an electrical diagram used with the invention.

Referring in greater detail to the drawings, the invention has been shown as applied to a house trailer T having a pair of rear wheels (not shown) and also having a forward tongue 1 at the forward end of which is a ball socket joint 2 which is adapted to be attached to the tractive (not shown) vehicle such as a car, truck or the like. The tongue is also provided with a front jack 3 which is extensible by the hand crank 4 and which conventionally carries a wheel (not shown) in the lower end. By means of this jack the tractive vehicle can be removed from the tongue and the trailer thus supported on the jack and maneuvered in a fore and aft direction thereby. With the dolly and associated wheel the trailer can be maneuvered to some extent by hand. With this conventional arrangement, however, the trailer is difficult to maneuver because of its weight and difficulty in steering the wheel and physically moving the trailer into proper position particularly in cramped quarters.

The present invention includes an electric gear, fractional horsepower motor M having a lower mounting base 5 and which also has a shaft gear reduction unit 6 attached directly thereto and which forms an integral part thereof. This gear unit reduces the speed of the motor shaft, for example from 1750 r.p.m. to 30 r.p.m. One of the wheels 7 is attached directly to the shaft 8 of the gear motor while the other wheel 9 is an idler which permits easy turning of the unit. Attached directly to the bottom mounting flange 5 of the motor is a frame 10 which is fabricated from angle iron and is of a generally rectangular shape disposed in a horizontal position beneath the motor. This frame is secured at one side by bolt means 11 to the motor. At the other side the projection 5a of the motor housing sets in an upstanding frame member 10a. The idler wheel 9 is journalled on frame member 10a by its shaft 9a.

The frame 10 protrudes from the forward side of the motor and has a vertically extending, tubular socket 12 welded thereto. This socket is adapted to receive the lower end of the jack 3 after the ground wheel (not shown) has been removed from the jack. The jack is inserted in the socket member 12 preferably before the tongue is detached from the car or other tractive vehicle. In other words the trailer jack is lowered into the socket 12 and then the jack is extended so as to remove the ball socket 12 from the hitch of the car. In this manner there is no lifting required to remove the trailer from the car and install it in the power dolly.

Extending from that side of the frame which is located opposite from the socket, is an upwardly extending operator's handle 13. More specifically the reduced portion 13a of handle 13 is insertable in the tubular member 14 welded to the frame 10. A set screw 15 is threaded in engagement with the member 14 and when tightened sufficiently contacts the handle 13 to lock it in place. When it is desired to store the power dolly, the thumb screw 15 is loosened and the handle 13 easily removed.

An alternate tubular member 14a is provided for the handle and extends at an angle from member 14 to give a different attaching location.

The electrical control switch box 16 is attached to the upper end of the handle and is connected with the motor by electrical lines 17 which are supported along the length of the handle. A polarized connector 18 permits easy disengagement of the line 17 from the motor electric lines 19 when the unit is to be disassembled. The electrical line 17 also extends from the switch box 16 and is adapted to be plugged into a power source (not shown) in the conventional manner.

FIGURE 6 is an electrical diagram which shows the spring loaded micro switch 22 extending from the box 16 and which the operator can conveniently depress or release while maneuvering the unit. For example, if the operator depresses the switch 22 the electric motor will operate in the forward direction. If the operator desires to reverse the direction of the motor and consequently drive wheel 7, it is only necessary for him to throw the three pole double throw toggle switch 23 and then again hold the micro switch 22 down. Thus the operator has immediate, positive control not only of the direction of the power dolly forward and reverse, but can also swing the unit about the jack 3 as a vertical pivot point to thereby maneuver the trailer.

It will be noted that the socket 12 is located closely adjacent the drive wheel 7 so that the weight of the trailer is close to the drive wheel. Because the socket 12 is of considerable vertical length and the jack 3 itself has a considerable length of bearing surface therewith, the frame 10 will not tip or tilt due to the weight of the trailer and thus there is no need for the operator to apply any downward force on the handle 12 to maintain the unit stable. Instead the unit is entirely self supporting and free to be turned in any direction.

*Operation*

When it is desired to leave the camping area, for example, it is only necessary to back a vehicle (not shown) into the proper position relative to the trailer tongue 1 and then lower the ball socket 12 onto the car hitch (not shown). The crank of the jack 3 can then be turned to raise the lower end of the jack out of the power dolly socket 12. The handle 13 of the dolly can then be detached by loosening screw 15 and the power unit can then be stored inside the trailer or car for further use.

Various modes of carrying out the invention are contemplated as being within the scope of the following claims particularly pointing out and distinctly claiming the subject matter which is regarded as the invention.

What is claimed is:

1. A portable dolly comprising, a reversible electric motor having a gear unit secured directly thereto and enclosed by a common housing, a drive shaft extending from the gear unit and from said housing and generally parallel to the longitudinal axis of said motor, a power drive wheel secured directly to said shaft, a generally rectangular and horizontally disposed frame rigidly secured directly to the underside of said motor, an upwardly extending socket secured to said frame at one side of said motor and adapted to removeably receive a jack of a trailer, said drive wheel located at one side of said frame, an idler wheel secured to said frame and at a side of the frame opposite from that of said drive wheel, an elongated operator's handle extending upwardly from said frame at the side of said motor opposite to said socket, and an electrical control means mounted on said handle connected with said motor and adapted to be connected to a source of electrical power, said control means adapted to operate said motor in either direction.

2. A dolly as defined in claim 1 further characterized in that said socket is located closely adjacent said drive wheel.

References Cited
UNITED STATES PATENTS

| | | | |
|---|---|---|---|
| 2,491,824 | 12/1949 | McKee | 180—19 XR |
| 2,786,690 | 3/1957 | Tharp | 280—3 |
| 3,156,315 | 11/1964 | Hawgood | 280—3 |
| 3,183,013 | 11/1965 | Brown | 280—3 |
| 3,269,740 | 8/1966 | Hutchinson | 180—12 |

BENJAMIN HERSH, *Primary Examiner.*

L. D. MORRIS, *Assistant Examiner.*